United States Patent Office 3,448,246
Patented June 3, 1969

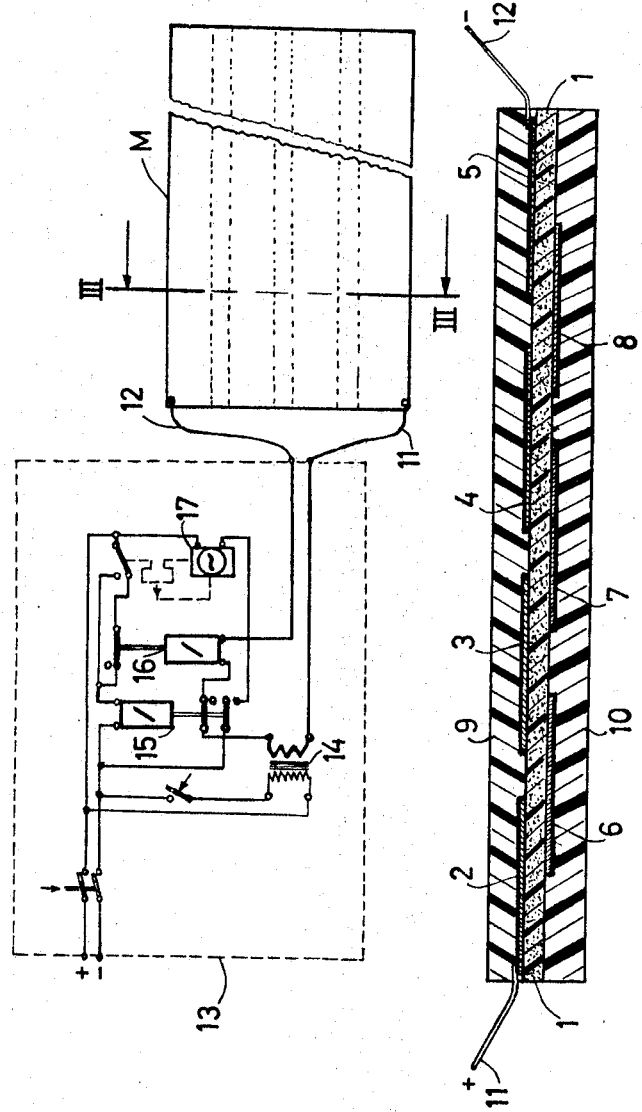

3,448,246
ELECTRICAL HEATING MAT WITH AUTOMATIC TEMPERATURE CONTROL
Fritz Armbruster, 23 Korntaler Strasse,
7000 Stuttgart-Stammheim, Germany
Filed Oct. 9, 1967, Ser. No. 673,565
Int. Cl. H05b 3/36
U.S. Cl. 219—528                 4 Claims

ABSTRACT OF THE DISCLOSURE

An electrical heating mat with automatic temperature control including electrical resistor means having a high electrical resistance and a temperature coefficient of resistance increasing steeply in the region between 0 and 100° C. so that current passing through the resistor means decreases as the temperature of the heating mat rises, a minimum current relay in circuit with the heating mat and disconnecting the same from a current supply when the current passing through the resistor means reaches a predetermined minimum, and time relay means in circuit with the minimum current relay for reclosing the latter after a predetermined time.

BACKGROUND OF THE INVENTION

Electrical heating mats are used to an increasing extent for various purposes, for instance for heating the floor or the walls of a room. In electrical heating mats it is necessary to prevent overheating of the mat by the electrical current passing therethrough, especially if the resistor of the heating mat is insulated by material, for instance plastic, which softens when the temperature surpasses a predetermined maximum temperature.

Various means for automatic temperature control of electrical heating mats are known in the art and the means known in the art include temperature sensing means incorporated in the heating mat per se to be subjected to the temperature rise produced by the same and cooperating with switch means for disconnecting the heating mat from a current supply when the temperature sensed by the temperature sensing means increases beyond a predetermined maximum temperature. The temperature sensing means may be combined with the switch means, for instance a bimetallic switch may be built-in the heating mat and which is constructed to open when the switch built in the heating mat is heated by the latter above a predetermined temperature. Of course, temperature sensing means or a temperature dependent switch built into the heating mat will sense the temperature of the latter only at the location where the temperature sensing means or the switch is located, and depending on the application of the heating mat, this specific spot may not be the spot where the highest temperature is reached during operation of the heating mat. In such a case the desired automatic temperature control will not operate satisfactorily.

Another difficulty residing in automatic temperature controls of electrical heating mats known in the art is that incorporation of a temperature sensing means or temperature dependent switches into the mat will obviously increase the manufacturing cost of the latter considerably. Furthermore, when the mats are flexible, the incorporation of even a small switch into the mat will render part of the same rigid, which for many applications is highly undesirable. In addition, large heating mats will consume considerable current, the control of which by small switches will be rather difficult and lead to a premature wear or burning out of the switch.

It is an object of the present invention to provide an electrical heating mat with automatic temperature control which avoids the above disadvantages of electrical heating mats of this type known in the art.

It is an additional object of the present invention to provide for an electrical heating mat with automatic temperature control in which no temperature sensing means or temperature dependent switches need to be incorporated in the electrical heating mat itself and in which all switch means for disconnecting the electrical heating mat from a current supply when the temperature of the heating mat rises above a predetermined maximum temperature are located outside of the heating mat per se.

SUMMARY OF THE INVENTION

With these objects in view, the electrical heating mat with automatic temperature control according to the present invention mainly comprises a pair of flexible sheet means of insulating material, electrical resistor means having a high electrical resistance and a temperature coefficient of resistance increasing steeply in the region between 0 and 100° C. sandwiched between the flexible sheets and forming with the latter a flexible heating mat, conductor means connecting the resistor means to a current supply so that the current passing through the resistor means decreases as the temperature of the heating mat rises, a minimum current relay in the conductor means movable between a closed and an open position and moving to the open position when the current passing through the conductor means drops to a predetermined minimum so as to disconnect the heating mat from the current supply, and time relay means in circuit with the minimum current relay means for moving the latter again to the closed position after a predetermined time.

The heating mat according to the present invention is preferably operated at low voltage, i.e., 25–30 v. and the arrangement may include a step down transformer between the electric current supply and the conductor means.

The electrical resistor means preferably comprise a layer of plastic material having small particles of electrically conductive material substantially uniformly distributed therein and metal foils arranged on opposite faces of the aforementioned layer in such a manner so that current supplied to the foils will pass through the layer substantially normal to the opposite faces thereof.

BRIEF DESCRIPTION OF THE DRAWINGS

FIG. 2 is a schematic wiring diagram showing apparatus according to the present invention and connecting the heating mat to a current supply; and FIG. 3 is a cross-section taken along the line III—III through the heating mat shown in FIG. 2.

DESCRIPTION OF THE PREFERRED EMBODIMENTS

Figure 1:
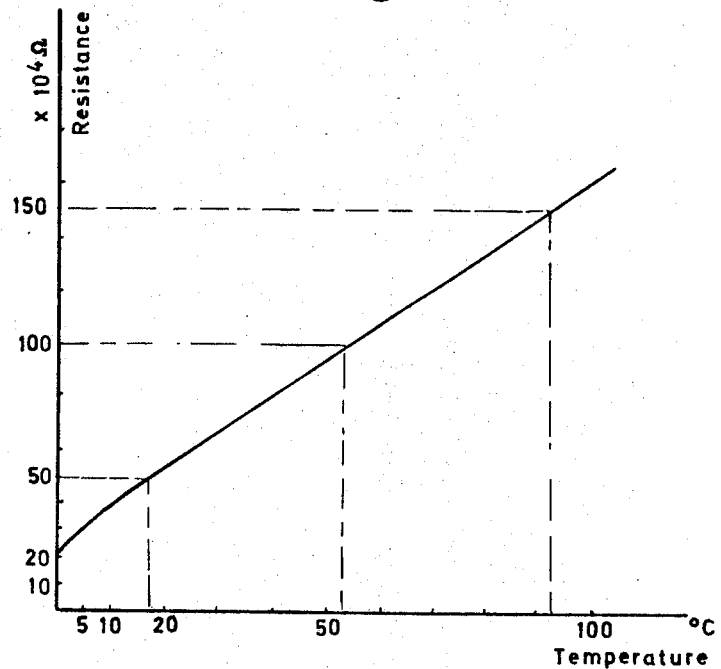
FIG. 1 is a diagram illustrating the increase of the electrical resistance of the resistor means of the electrical heating mat according to the present invention in dependence on the increase of the temperature of the heating mat.

The electrical heating mat with automatic temperature control, according to the present invention, comprises electrical resistor means which preferably have a construction and composition as will be explained later on in detail, and which have a high electrical resistance and a temperature coefficient of resistance which increases steeply even in the region between 0 and 100° C. The electrical resistance of the resistor means of the heating mat according to the present invention may, for instance, vary in dependence on the temperature of the heating mat as illustrated by the curve c of FIG. 1 so that the resistance at a temperature of less than 20° C. will be about $50 \times 10^4$ Ohms, while the electrical resistance of the heating mat will reach a value of about $100 \times 10^4$ Ohms when the temperature of the heating mat rises slightly above 50° C. In general, the rise of the resistance in dependence on the rise of the temperature of the heating mat according to the present invention should be at least about 1% for each degree C.

The heating mat according to the present invention may be constructed as shown in cross-section in FIG. 3 in which the resistor comprises a central layer or sheet 1 of plastic material, for instance polyvinyl chloride in which small particles of electrically conductive material are uniformly distributed over the whole cross-section of sheet, and in which thin metal foils 2, 3, 4 and 5 transversely spaced from each other and extending in longitudinal direction of the heating mat are applied to one face of the sheet 1, whereas a second plurality of metal foils 6, 7 and 8 are applied transversely spaced from each other and offset transversely with respect to the first plurality of metal foils are applied to the opposite face of the sheet 1. When a current is supplied by the conductors 11 and 12 to the metal foil strips 2 and 5 extending in longitudinal direction along marginal portions on one face of the sheet 1, current will flow through the foil 2 and from there in direction substantially normal to the plane of the foil through the sheet 1 to the portion of the foil strip 6 arranged opposite to the corresponding portion of the foil 2 and back again through the sheet to the foil 3 and so on until the current finally reaches the foil 5 and passes through the conductor 12 to the other pole of the current supply. In other words, in a heating mat as shown in FIG. 3 the current will flow substantially over the whole cross-section of the sheet 1 and in direction substantially normal to the main faces thereof. The sheet 1 and the metal foils applied to opposite faces thereof are preferably sandwiched between a pair of sheets 9 and 10 of electrically nonconductive plastic material, for instance polyvinyl chloride, and the various above-described components are united to a flexible heating mat by application of heat and pressure. The metal foils and the sheet of electrically conductive material may be arranged in various different manners and various embodiments of such heating mats are disclosed in the copending application Ser. No. 673,568 and entitled, "Electrical Heating Mat."

While it is preferred to construct the electrical heating mat according to the present invention as shown in FIG. 3 or as shown and described in the other figs. of the aforementioned copending application, it is not absolutely necessary according to the present invention to construct the electrical resistor means of the heating mat according to the present invention from a plastic sheet with small electrically conductive particles distributed throughout the cross-section thereof, and metal foils applied to the faces of the sheet, but it is only necessary that the resistor means of the heating mat according to the present invention have a high electrical resistance and a temperature coefficient of resistance which increases steeply in the region between 0 and 100° C. When the electrical heating mat is provided with electrical resistor means of the aforementioned kind, the current passing through the resistor means will obviously decrease as the temperature of the heating mat rises. This will automatically lead to a state of equilibrium in which the heat produced by the current passing through the electrical resistor means will be equal to the heat emitted by the heating mat by radiation or heat convection to the elements surrounding the same.

Furthermore, according to the present invention additional control means outside the heating mat are provided to automatically disconnect the heating mat from the current supply when due to the increase of the temperature of the heating mat the current passing therethrough decreases below a predetermined minimum and to reconnect the heating mat to the current supply after a predetermined time and after the heating mat has cooled off again to a temperature below the predetermined temperature.

Such control means 13 may include apparatus as shown in the wiring diagram of FIG. 2 and which preferably comprises a stepdown transformer connected to normal network voltage of a DC or AC current supply and the low voltage side of the transformer 14 is connected over a main relay 15 and a minimum current relay 16 to conductors 11 and 12 which in turn are connected at the other end thereof to the terminals of the heating mat as shown in cross-section in FIG. 3. Further connected in circuit with the relays 15 and 16 is a time relay 17 of known construction which will cooperate with the relays 15 and 16 in the manner as will be described in detail further below.

The heating mat according to the present invention will operate as follows:

A current will be supplied through the transformer 14 and the relays 15 and 16, when the latter are closed, to the heating mat M so that current will flow through the resistor means of the heating mat and heat the latter. Since the resistor means of the heating mat have a temperate coefficient of resistance which increases steeply with increase of the temperature, the electrical resistance of the resistor means of the heating mat according to the present invention will rise during operation of the mat and the current passing through the minimum current relay 16 will decrease as the temperature of the mat M rises. When the current passing through the minimum current relay 16 drops below a predetermined minimum, the relay 16 will open and open at the same time the main relay 15, electrically or mechanically connected in a known manner to the minimum relay 16, interrupting thereby current supply to the heating mat M. When the main relay 16 opens it will automatically energize the time relay 17 which is constructed and connected in a known manner to the relays 15 and 16 to close the latter as predetermined time intervals until after the heating mat has cooled off to a temperature below the predetermined temperature so that the current passing through the resistor means will be above the predetermined minimum current and the relays 15 and 16 will stay closed while the time relay will be disconnected until the heating mat M heats up again above the predetermined temperature and the aforementioned cycle is repeated.

When the eletcircal heating mat is provided with resistor means as described in connection with FIG. 3 or with similar electrical resistance means as disclosed in the aforementioned copending application in which small particles of electrically conductive material are uniformly distributed in colloidal form, that is with a grain size of less than 0.1 micron, it is immaterial whether these small particles are formed from metal or carbon, for instance carbon black, even though carbon has an electrical resistance which decreases with rising temperature. Nevertheless, the electrical resistance of resistor means constructed in this manner will increase with rising temperature which may be due to the fact that the plastic material in which the small particles are embedded expands during rise of the temperature, increasing thereby the distance between the electrically conductive small particles embedded therein and resulting thereby in an electrical resistance which increases steeply with the rise of the temperature regardless whether the the small particles are formed from metal or carbon.

In a heating mat constructed as shown in cross-section in FIG. 3 or as disclosed in the aforementioned copending application in which metal foils are applied to the faces of the electrically conductive sheet, the metal foils will also uniformly distribute the heat produced in the electrical resistor means so that local overheating of the heating mat will be positively avoided. Therefore, the electrical heating mat with automatic temperature control according to the present invention preferably comprises electrical resistor means of the type as illustrated in FIG. 3 or of the type of the other embodiments disclosed in the aforementioned copending application.

It will be understood that each of the elements described above, or two or more together, may also find a useful application in other types of electrical heating mats with automatic temperature control differing from the types described above.

While the invention has been illustrated and described as embodied in an electrical heating mat with automatic temperature control in which the electrical resistor means comprise a layer of plastic material having small particles of electrically conductive material substantially uniformly distributed therein and metal foils arranged on faces of the aforementioned layer in such a manner so that current supplied to the foils will pass through the layer subsantially normal to the opposite faces thereof, it is not intended to be limited to the details shown, since various modifications and structural changes may be made without departing in any way from the spirit of the present invention.

However, also different electrical resistor means may be used for the electrical heating mat with automatic temperature control according to the present invention as long as the temperature coefficient of resistance of the electrical resistor means increases steeply in the region between 0 and 100° C. temperature of the heating mat.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An electrical heating mat with automatic temperature control comprising, in combination, a pair of flexible sheets of insulating material; electrical resistor means having a high electrical resistance and a temperature coefficient of resistance increasing steeply in the region between 0 and 100° C. sandwiched between the pair of flexible sheets and forming with the latter a flexible heating mat; conductor means connecting said resistor means to a current supply so that the current passing through the resistor means decreases as the temperature of said heating mat rises; a minimum current relay in said conductor means movable between a closed and an open position and moving to said open position when the current passing through said conductor means drops to a predetermined minimum so as to disconnect said heating mat from said current supply; and time relay means in circuit with said minimum current relay means for moving the latter again to the closed position after a predetermined time.

2. An electrical heating mat as defined in claim 1, wherein said electrical resistor means are sheet like and substantially coextensive with the pair of flexible sheets of insulating material.

3. An electrical heating mat as defined in claim 1, wherein said electrical resistor means comprise a layer of plastic material having small particles of electrically conductive material substantially uniformly distributed therein, and metal foils arranged on main faces of said layer in such manner so that current supplied to said foils will pass through the layer substantially normal to said main faces thereof.

4. An electrical heating mat as defined in claim 1 wherein said heating mat is operated at low voltage and including a stepdown transformer between the electrical current supply and said conductor means.

References Cited
UNITED STATES PATENTS

| | | | |
|---|---|---|---|
| 2,688,070 | 8/1954 | Freedlander | 219—528 |
| 2,971,073 | 2/1961 | Eisler | 338—212 X |
| 3,143,640 | 8/1964 | Becker | 219—494 |
| 3,221,145 | 11/1965 | Hager | 219—549 |
| 3,281,579 | 10/1966 | Glicksman | 29—535 |
| 3,397,302 | 8/1968 | Hosford | 219—528 |

VOLODYMYR Y. MAYEWSKY, *Primary Examiner.*

U.S. Cl. X.R.

219—345, 494, 514, 519, 549; 317—132